May 11, 1965 A. A. BERG ETAL 3,182,566
BRAKE SYSTEM AND RELEASE
Filed Aug. 6, 1962 2 Sheets-Sheet 1
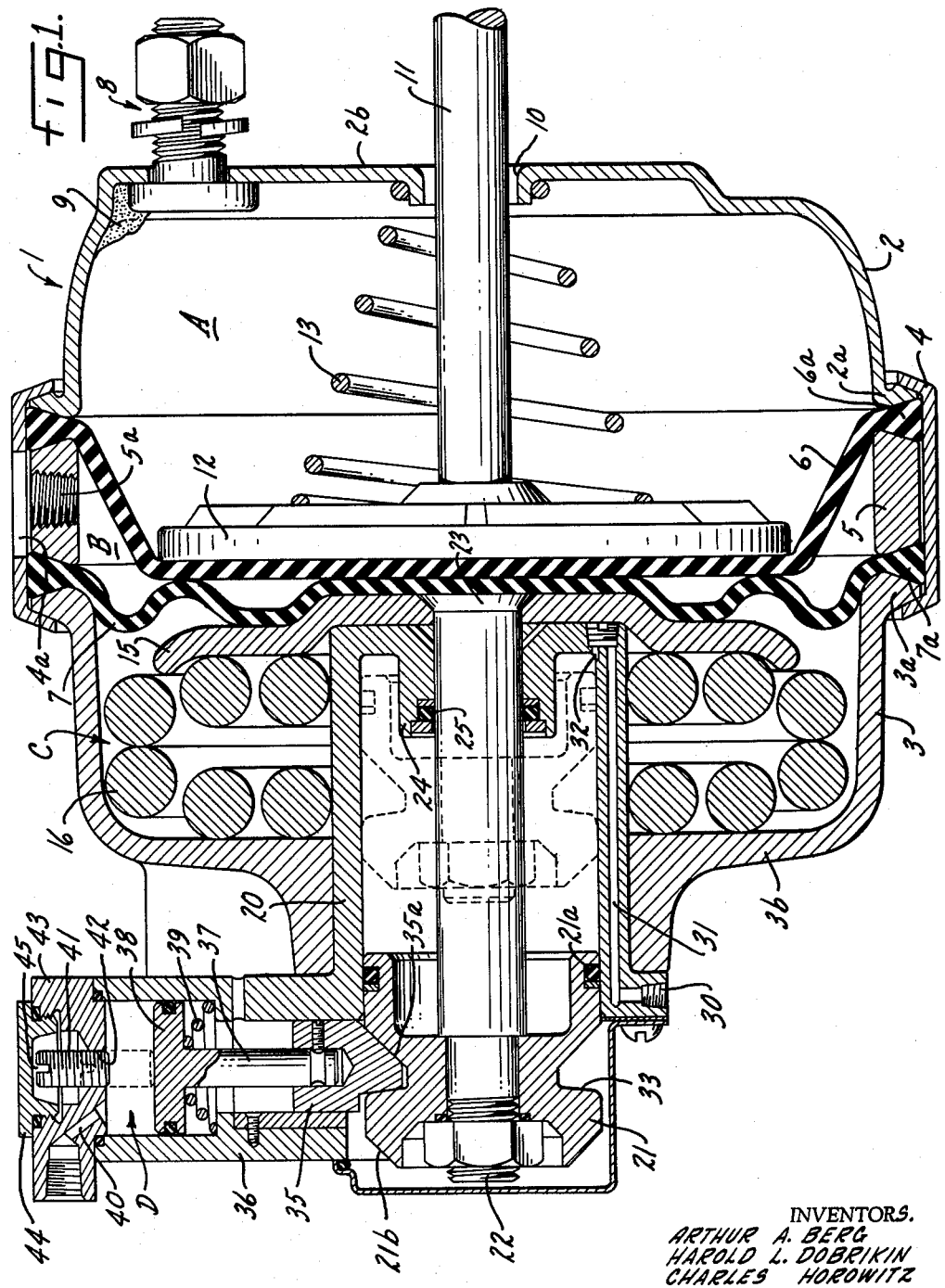
INVENTORS.
ARTHUR A. BERG
HAROLD L. DOBRIKIN
CHARLES HOROWITZ
BY Parker & Carter
Attorneys.

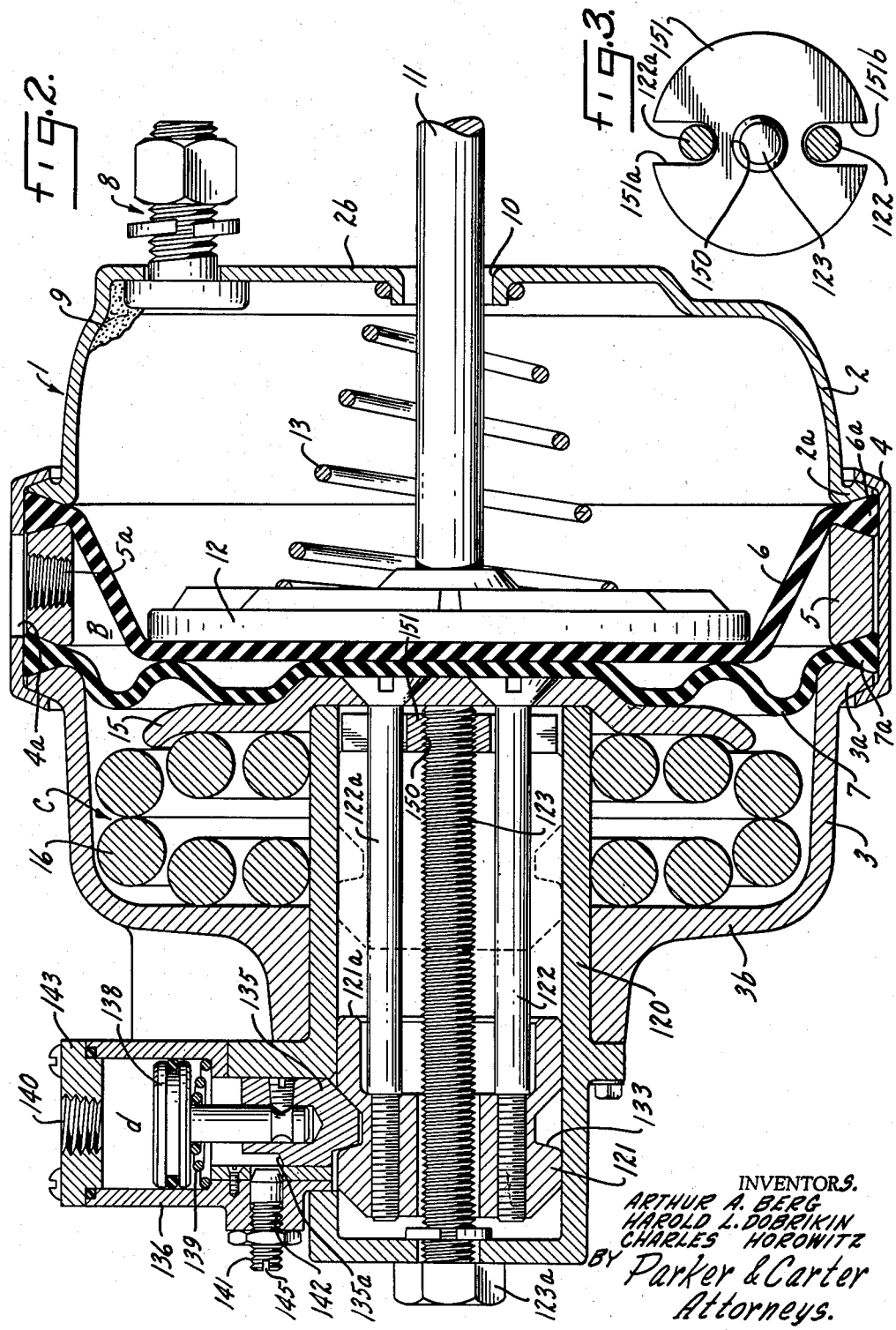

United States Patent Office 3,182,566
Patented May 11, 1965

3,182,566
BRAKE SYSTEM AND RELEASE
Arthur A. Berg, Lincolnwood, Harold L. Dobrikin, Highland Park, and Charles Horowitz, Chicago, Ill., assignors, by mesne assignments, to Berg Mfg. & Sales Co., Des Plaines, Ill., a corporation of Illinois
Filed Aug. 6, 1962, Ser. No. 215,086
19 Claims. (Cl. 92—24)

This invention relates to brake systems and has particular relation to the fluid brake systems employed in connection with vehicles, such as truck-trailer combinations and the like.

One purpose is to provide a brake-operating means effective to apply the brakes of a vehicle through a normal fluid pressure service system.

Another purpose is to provide a power means for operating the brakes of a vehicle in automatic response to the loss of fluid pressure in the brake system thereof.

Another purpose is to provide a unitary assembly capable of operating the brakes of a vehicle through employment of the normal fluid pressure system therewith associated and of applying the brakes of said vehicle by means of an emergency system.

Another purpose is to provide a brake-operating means having a release mechanism associated therewith.

Another purpose is to provide a means of holding inoperative an emergency brake-operating mechanism.

Another purpose is to provide an emergency brake-operating device having alternate pressure and mechanical release means.

Another purpose is to provide a brake-operating means responsive automatically to a loss of fluid pressure and a mechanical means for defeating said automatic operation.

Another purpose is to provide a brake-operating means having a fluid pressure release therefor and means for obviating the effect of leaks in said release.

Another purpose is to provide a brake-operating mechanism and release assembly of maximum simplicity and minimum size and weight factors.

Other purposes will appear from time to time during the course of the specification and claims.

The invention is illustrated more or less diagrammatically in the accompanying drawings, wherein:

FIG. 1 is a side elevation illustrating one form of the invention;

FIG. 2 is a side elevation illustrating a variant form of the invention; and

FIG. 3 is an end view of an element of the invention.

Like parts are indicated by like numerals throughout the specification and drawings.

Referring now to the drawings, and particularly to FIG. 1, the numeral 1 illustrates generally a housing. The housing 1 may be formed of a pair of chamber-forming shell members 2, 3, the peripheral open ends thereof being joined by a suitable clamp mechanism such as the ring 4. An annulus 5 lies within the ring 4 between and spaced from the peripheral ends 2a, 3a of shells 2, 3. A service diaphragm 6 has its peripheral edge 6a clamped between one edge of ring 5 and the portion 2a of shell 2. An emergency diaphragm 7 has its peripheral edge 7a clamped between portion 3a of shell 3 and the opposite edge of ring 5. Thus the housing 1 is divided by diaphragms 6, 7 into a return spring chamber A, a service pressure chamber B and an emergency spring chamber C. The clamp ring 4 and space ring 5 are apertured, as indicated respectively at 4a, 5a to provide a fluid pressure inlet into chamber B between diaphragms 6, 7.

Suitable attaching members, such as the fastener indicated generally at 8, secure the assembly to a support mounted on the vehicle with which the assembly is associated. A weld 9 transfers a portion of the stress affecting fastener 8 and shell 2 to the cylindrical portion of the latter.

The end face 2b of shell 2 is centrally apertured as at 10 to permit passage therethrough of a brake-operating rod 11. A pad 12 is carried on the inner end of rod 11 for contact with one surface of diaphragm 6. A return spring 13 has its opposite ends operative against the inner surface of end face 2b and the opposed surface of pad 12.

A pressure plate 15 is positioned in chamber C for operative engagement with an opposed surface of diaphragm 7. An emergency brake-operating spring 16 is positioned in chamber C and has its opposite ends engaging the inner surface of end plate 3b of shell 3 and the opposed surface of pressure plate 15. A cylinder 20 has a portion extending into chamber C for a distance approximating the compressed length of spring 16. Slidably mounted within cylinder 20 is a release piston 21. A bolt 22 secures piston 21 to pressure plate 15, the bolt 22 extending outwardly of cylinder 20 for attachment to plate 15 as indicated generally at 23. The connector 22 may be welded or otherwise secured to plate 15 and the two may, for example, be formed integrally. The bolt 22 is slidable in an inwardly extending boss 24 at the inner end of cylinder 20, a seal 25 serving to seal the bolt or rod 22. The plate 15 seats against the inner end face of cylinder 20 when piston 21 is in the release position illustrated in full lines in FIG. 1.

A fluid pressure inlet 30 communicates with an elongated passage 31 formed in the wall of cylinder 20. The passage 31, in turn, communicates with the area within cylinder 20 at its inner end as indicated at 32.

An annular groove or slot 33 is formed in the cylindrical surface of piston 21 intermediate its ends. A keeper or locking pawl 35 is slidably mounted in an auxiliary housing 36, the inner end of which communicates with the area within cylinder 20. Secured to the keeper 35, as by extension 37, is a second piston 38. The piston 38 is slidably mounted in auxiliary chamber D formed in housing 36. A return spring 39 is positioned on that side of piston 38 nearest the keeper 35. The opposite face of piston 38 is exposed to a fluid pressure inlet passage 40.

A locking screw 41 is threadably mounted in a passage 42 formed in end closure plate 43 of housing 36. A protective cap 44 engages the outer face of end member 43 and overlies the outer end face of screw 41. A tool-engaging conformation or groove 45 is formed in the outer end surface of screw 41.

Referring now to FIG. 2, in which a variant form of the invention is illustrated, it will be observed that a number of the parts are identical with those above described. For convenience and clarity, therefore, said identical parts will not be further described and have been given the same reference numerals.

In FIG. 2 the release piston 121 is secured to pressure plate 15 by a plurality of fastener members or bolts such as those indicated at 122, 122a. As illustrated, two such bolts are spacedly engaged at one end with piston 121 and at their opposite ends with plate 15 outwardly of cylinder 120. A release bolt 123 has a head 123a positioned outwardly of cylinder 120 and its major portion extending through piston 121 and between rods 122, 122a. The circumferential surface of release bolt 123 is threaded and the threads thereof engage an inwardly threaded aperture 150 formed at the center of a retraction plate 151. The retraction plate 151 has radially, inwardly directed, circumferentially spaced slots 151a, 151b in which the rods 122, 122a are positioned. The peripheral portions of plate 151 are of sufficient dimension to engage the inner annular end face 121a of piston 121.

An auxiliary housing 136 communicates with the area within cylinder 120 and a locking pawl 135 engages a slot or groove 133 formed in piston 121. A second piston 138 is slidably mounted within a chamber d within housing 136. A return spring 139 is effective against one surface of piston 138. The opposite surface of piston 138 is exposed to a fluid pressure inlet 140 formed in an end cap 143 of housing 136. A lock screw 141 has a tool-engaging conformation 145 in an end portion thereof positioned outwardly of housing 136. The screw 141 occupies a passage 142 extending laterally through a side wall of housing 136. The inner end 141a of screw 141 is formed and positioned for engagement with an offset 135a formed in a rear portion of pawl 135.

The use and operation of the invention are as follows:

In normal operation fluid pressure, which may for example be air, is delivered through inlet 4a, 5a to chamber B between diaphragms 6, 7. The pressure entering chamber B causes diaphragm 6 to be moved toward end portion 2b of shell 2, i.e. to the right in FIG. 1, and to move pad 12 and rod 11 with diaphragm 6 to apply the brakes of the vehicle.

In normal operation fluid pressure, which may for example be air, is also supplied to chamber D through inlet 40. The inlet 40 may be connected, when desired, to the emergency reservoir or fluid pressure system of the vehicle, for example. The pressure in chamber D holds piston 38 and pawl 35 in the locking position illustrated in FIG. 1. With the pawl 35 engaging the slot 33 of the piston the pressure plate 15 is held, through bolt 22, in the retracted position illustrated in FIG. 1 and the spring 16 is held compressed thereby. Pressure entering chamber B thus merely holds diaphragm 7 against plate 15 and since plate 15 is in substantial alignment with edge 7a of diaphragm 7, such pressure has virtually no effect on diaphragm 7 and is expended upon diaphragm 6, as above described, to apply the brakes. In the event of loss of fluid pressure in chamber D, through a breakage in the system lines or a leak developing in the vehicle system or from any other cause, the return spring 39 moves piston 38 toward inlet 40, thus withdrawing locking pawl 35 and releasing piston 21 and thus releasing spring 16. At this time, no fluid pressure is present in cylinder 20. The spring 16 is of sufficient power to apply the brakes of the vehicle and does so by moving pressure plate 15 against diaphragm 7 and diaphragm 7 against diaphragm 6 and pad 12 to move the brake-operating rod 11 outwardly of housing 1, or to the right as the parts are shown in FIG. 1 to apply the brakes.

With the brakes thus applied the vehicle cannot, of course, be moved. On occasion it becomes important to move the vehicle promptly out of the line of traffic or from other undesirable position and to do so before the cause of the loss of air pressure can be determined or repaired. Thus is provided the fluid pressure inlet 30 which may, for example, be connected with a source of hydraulic pressure. The said source may conveniently comprise a hydraulic pump with a manual operating means available to the vehicle operator within the operator's cabin. Upon operation or actuation of such hand pump or other hydraulic pressure source, hydraulic pressure is delivered through passage 31 and inlet 32 to the rear face of piston 21. The resulting increase in hydraulic pressure within cylinder 20 moves piston 21 from the "brakes on" dotted line position shown in FIG. 1 to the "emergency brakes off" full line position shown in FIG. 1. By maintaining hydraulic pressure thus within cylinder 20 through inlet 32 the brakes may be held in "off" position while the vehicle is moved to another or safer place.

Since hydraulic seals, such as the seals 21a of piston 21, are subject to leakage, a mechanical means is provided for locking the emergency brake mechanism in "brakes off" position in order to permit movement of the vehicle over a substantial distance during which such hydraulic leakage might occur.

By providing a release valve for operation in the vehicle operator's cabin, the vehicle operator may alternately pump pressure into cylinder 20 to hold the brakes "off" and actuate such release valve to allow the pressure in cylinder 20 rapidly to dissipate, thus allowing spring 16 to put the brakes "on." In such operation the return spring 39 holds the mechanical, positive lock of the invention out of locking engagement.

For continued operation in "brakes-off" position, however, the seals 21a cannot be relied upon. With emergency pressure available, the lock is held engaged with piston 21 to maintain locked, positive "brakes off" position. If desired, the operator may release such emergency air pressure, allowing spring 39 to withdraw the lock and spring 16 to apply the brakes.

Piston 21 has a chamfered end face as indicated at 21b and pawl 35 has a camming surface 35a for engagement by surface 21b to assure movement of pawl 35 out of locking position when piston 21 is retracted.

The mechanical system includes means useful when emergency pressure is not available in chamber D, such as the screw 41 which, when turned, may be brought into the dotted line position illustrated in FIG. 1 to engage the end face of piston 38 normally impinged upon by fluid pressure in chamber D and thus to move and hold the piston 38 against the action of spring 39 and to move pawl 35 into engagement with the slot 33 formed in piston 21, the piston 21 having been moved to position for engagement with pawl 35 by the hydraulic pressure entering at inlet 32.

Referring now to FIG. 2, the use and operation of the normal service brake system are substantially identical to that above-described with respect to the device of FIG. 1. Fluid or "service" pressure is normally supplied by the operation of the vehicle foot brake and delivered through inlets 4a, 5a to chamber B. Since diaphragm 7 is positioned against pressure plate 15 and since pressure plate 15 is positioned against the inner end surface of cylinder 20, the diaphragm 7 is not substantially affected by said pressure. The diaphragm 6, however, is moved to the right, as the parts are shown in the drawings, to apply the brakes through pad 12 and rod 11.

Upon failure of fluid or "emergency" pressure in chamber d the return spring 139 moves piston 138 outwardly toward inlet 140 to withdraw pawl 135 and spring 16 is immediately effective to move pressure plate 15 against diaphragm 7 and, through diaphragm 6, to move plate 12 and rod 11 to the right, as the parts are shown in the drawings, to apply the brakes.

In FIG. 2 we illustrate a mechanical means for releasing the emergency brake thus applied to facilitate movement of the vehicle. The head 123a of bolt 123 may be rotated by engagement thereof with any suitable tool. The bolt 123 rotates in place. Rotation of bolt 123, the threads of which engage the retraction plate 151, causes the plate 151 to move along bolt 123 toward head 123a, since the plate 151 is prevented from rotation by engagement of rods 122a with slots 151a, 151b. At the time of rotation of head 123a to release the brakes of the vehicle the piston 121 is in the dotted line position illustrated in FIG. 2. In this position the inner end surface 121a of piston 121 engages a major peripheral portion of plate 151. Retraction or withdrawal of plate 151 along bolt 123 thereby causes movement of piston 121 rearwardly in cylinder 120 to the full line position illustrated in FIG. 2.

In FIG. 2 an alternate means of mechanically locking cylinder 121 in retracted position and thus to hold the brakes in "off" position is illustrated at 141–145. If fluid pressure be available for delivery to chamber d, the same may be employed to move the pawl 135 into locking position and engagement with piston 121. Thereupon the screw 141 may be rotated inwardly to bring the end portion 141a into engagement with the recess 135a in pawl 135 and thus to hold the pawl in the locking position illustrated in FIG. 2.

It will be understood that the locking means 41 or 121 may be alternately positioned in the locations illustrated with either the fluid pressure retraction system illustrated in FIG. 1 or the mechanical retraction system illustrated in FIG. 2. It will be further realized that the fluid pressure retraction system illustrated in FIG. 1 and the mechanical retraction system illustrated in FIG. 2 could be suitably combined, for example by closing the inner open end of cylinder 20 in FIG. 2 except for sealed apertures through which rods 122, 122a would pass and by adding inlets 30 and 32 and passage 31 as shown in FIG. 1 to provide an alternate retraction means in a single assembly without departing from the nature and the scope of the invention. Thus, while there has been described and claimed variant forms of the invention, many changes may be made in the number, shape, formation and connection of parts without departing from the invention and the same is limited therefore only by the scope of the following claims.

We claim:

1. Brake-operating means comprising a housing, a pair of diaphragms spacedly dividing said housing into a plurality of chambers, a brake-operating rod operatively engaging one of said diaphragms and extending through one of said chambers and outwardly from said housing, a fluid presure inlet communicating with another of said chambers, a push plate positioned in still another of said chambers and engaging the other of said diaphragms, a spring positioned in said last-named chamber and engaging said plate to urge the same against said last-named diaphragm, a cylinder communicating with said housing, a piston slidable in said cylinder and secured to said plate, a fluid pressure inlet communicating with the area within said cylinder to deliver fluid pressure to said piston and to urge said piston away from said last-named diaphragm, and fluid-pressure-response means for locking said piston against longitudinal movement within said cylinder.

2. Brake-operating means comprising a housing, a brake-operating rod having a portion positioned within said housing and a portion extending outwardly therefrom, fluid-pressure-responsive means in said housing for moving said rod, emergency means in said housing for moving said rod, and means for inactivating said emergency means, said last-named means including a piston operatively engaging said emergency means, a cylinder surrounding said piston, a fluid pressure inlet positioned in said cylinder to deliver fluid pressure to one side of said piston, fluid-pressure-responsive locking means associated with said cylinder to lock said piston when said emergency means have been rendered inactive and holding means movable into a position effective to hold said locking means in engagement with said piston.

3. A brake-operating assembly including a housing, brake-operaitng means extending outwardly from said housing, fluid-pressure-responsive means in said housing for moving said brake-operating means toward brakes-on position, spring-pressure-responsive means in said housing for urging said brake-operating means toward brakes-on position, and means for urging said spring-pressure-responsive means away from brakes-on position, said last-named means including a cylinder communicating with said housing, a piston slidable in said cylinder and operatively engaging said spring-pressure-responsive means, said piston having a brake-on position in said cylinder and a brakes-off position in said cylinder, means for moving said piston toward said brakes-off position and fluid-pressure-responsive locking means for locking said piston in said brakes-off position.

4. Brake-operating means including a housing, a pair of diaphragms spacedly dividing said housing and forming therebetween a chamber, fluid pressure inlet means communicating with said chamber to deliver fluid pressure between said diaphragm, a brake-operating member having a portion positioned in said housing for contact by one of said diaphragms and a portion extending outwardly of said housing, a push plate engaging the other of said diaphragms, a cylinder communicating with said housing, a piston reciprocal in said cylinder and secured to said push plate, a spring in said housing and operatively engaging said push plate to urge said push plate against said other diaphragm and to move said other diaphragm toward said brake-operating member, means for moving said piston away from said other diaphragm and fluid-pressure-responsive means for locking said piston against movement within said cylinder.

5. The structure of claim 4 wherein said piston-moving means includes a fluid pressure inlet communicating with the area within said cylinder between said piston and said plate.

6. The structure of claim 4 wherein said piston-moving means comprises a retraction plate slidably mounted in said cylinder, an elongated member operatively engaging said retraction plate and having a portion extending outwardly of said cylinder, and means for restricting said retraction plate against rotation whereby rotation of said elongated member causes movement of said plate longitudinally within said cylinder, said plate being positioned to engage said piston.

7. The structure of claim 4 wherein said locking means comprises a pawl, an auxiliary housing, a second piston reciprocal in said auxiliary housing and secured to said pawl, a fluid pressure inlet positioned in said auxiliary housing to deliver fluid pressure to one side of said piston to urge the same toward said cylinder and to urge said pawl inwardly of said cylinder to engage said first piston, a second spring positioned in said auxiliary housing to urge said piston away from said second cylinder.

8. The structure of claim 7 characterized by and including means for locking said second piston against movement in the direction in which it is urged by said last-named spring.

9. A brake-operating assembly comprising a housing, a brake-operating member positioned in said housing and having a portion extending outwardly thereof, fluid-pressure-responsive means in said housing for moving said member toward brakes-on position, alternate means in said housing for moving said brake-operating member toward brakes-on position, said alternate means including a cylinder, a piston reciprocal in said cylinder, a member secured to said piston for operatively engaging said brake-operating member, means for moving said piston and member toward brakes-on position, means for moving said piston and member toward brakes-off position, fluid-pressure-responsive means for locking said piston and member in said brakes-off position, said last-named means including a pawl slidably mounted for lateral reciprocation into and out of said cylinder, a movable wall engaging said pawl, said wall being movable in one direction in response to fluid pressure, yielding means positioned to urge said wall in the opposite direction and means operable from outside said cylinder to engage said locking means and to hold said locking means in locking position.

10. A brake-operating assembly comprising a housing, a pair of diaphragms spacedly dividing said housing, a brake-operating member having a portion positioned in said housing for contact with one side of one of said diaphragms and a portion extending outwardly of said housing, a fluid pressure inlet in said housing positioned to deliver fluid pressure between said diaphragm, a push plate positioned in said housing for engagement with that side of the other of said diaphragms opposite to the side opposed to said first diaphragm, a spring positioned in said housing and engaging said push plate to urge the same against said other diaphragm, a cylinder communicating with and extending into said housing, said push plate being seated against the inner end of said cylinder when said push plate is in brakes-off position, said second diaphragm being held substantially in its at-rest condition when said push plate is seated against the inner end of said cylinder, a piston reciprocal in said cylinder and secured to said push plate, means communicating with said cylinder for moving said piston in a direction away from said housing to cause said push plate to seat upon the inner end of said cylinder and to compress said spring, a locking pawl associated with said cylinder and penetrating the same to engage said piston, and fluid-pressure-responsive means for moving said pawl toward its locking position.

11. An emergency brake-operating assembly comprising a housing, a thrust member movable in said housing, yielding means in said housing positioned to urge said thrust member in one direction, a cylinder communicating with said housing, a piston reciprocal in said cylinder and secured to said thrust member, means in said cylinder to urge said piston and said thrust member in the opposite direction, fluid-pressure-responsive means for locking said piston against movement in said first-named direction, means for releasing said locking means, said releasing means including a yielding member engaging said locking means and urging said locking means away from locking engagement with said piston.

12. The structure of claim 11 wherein said piston-moving means comprises a fluid pressure inlet communicating with the area within said cylinder between said piston and said thrust member.

13. The structure of claim 11 wherein said piston-moving means comprises a plate positioned in said cylinder to engage said piston, a threaded member having a portion extending from a point outside said cylinder to a point inside said cylinder and engaging said plate to move the same longitudinally within said cylinder.

14. The structure of claim 11 wherein said locking means includes an auxiliary housing, a fluid-pressure-responsive member movable in said housing, a fluid pressure inlet communicating with said auxiliary housing and positioned to deliver fluid pressure to one side of said fluid-pressure-responsive member to urge the same in one direction, a spring positioned in said auxiliary housing to urge said fluid-pressure-responsive member in the opposite direction, a pawl penetrating said cylinder to engage said piston, said fluid-pressure-responsive member operatively engaging said pawl to urge the same inwardly of said cylinder in response to delivery of fluid pressure through said last-named inlet.

15. An emergency brake-operating means comprising a housing, a thrust member, yielding means positioned in said housing to urge said thrust member toward brakes-on position, a cylinder, a piston reciprocal in said cylinder between a brakes-on and a brakes-off postion, means secured to said piston and extending into said housing said last-named means being secured to said thrust member within said housing, a fluid pressure inlet positioned in said cylinder to deliver fluid pressure to one side of said piston to urge said piston toward brakes-off position, and a locking member penetrating said cylinder to engage said piston and to lock the same in said brakes-off position.

16. The structure of claim 15 characterized by and including means for moving said locking member between locking and non-locking postion, said last-named means including a second housing, a fluid-pressure-responsive member movable in said second housing, a fluid pressure inlet positioned in said second housing to urge said member toward locking position, yielding means positioned in said second housing to urge said fluid-pressure-responsive member toward non-locking position, said fluid-pressure-responsive member having an operative engagement with said locking member.

17. The structure of claim 16 characterized by and including means for rendering said yielding means inoperative.

18. The structure of claim 17 wherein said last-named means includes a threaded member penetrating the wall of said second housing to engage said fluid-pressure-responsive member.

19. For use with a brake-operating assembly which includes a housing, a thrust member in said housing and a spring positioned in said housing to engage said thrust member to urge it toward brakes-on position, a release mechanism comprising a cylinder, a piston reciprocal in said cylinder, means securing said piston to said thrust member, said piston having a brakes-on and a brakes-off position in said cylinder, means for urging said piston toward said brakes-off position, and fluid-pressure-responsive means mechanically engaging said piston to lock the same in said brakes-off position.

References Cited by the Examiner

UNITED STATES PATENTS

| 859,843 | 7/07 | Rogers | 92—94 |
| 2,181,562 | 11/39 | Ganahl et al. | 92—21 |
| 2,743,706 | 5/56 | Veenschoten | 92—27 |
| 2,754,805 | 7/56 | Beman | 92—37 |
| 2,873,579 | 2/59 | Safford | 92—28 |
| 2,976,085 | 3/61 | Grogan | 92—48 |
| 3,062,591 | 11/62 | Brimhall | 92—130 |

FOREIGN PATENTS

| 314,068 | 7/56 | Switzerland. |

RICHARD B. WILKINSON, *Primary Examiner.*